United States Patent [19]

Fisher et al.

[11] Patent Number: 4,948,516
[45] Date of Patent: Aug. 14, 1990

[54] METHOD OF DISPOSING OF WASTES CONTAINING HEAVY METAL COMPOUNDS

[75] Inventors: David O. Fisher, Chesterfield, Mo.; Kent P. Lannert, Freeburg, Ill.

[73] Assignee: Monsanto Company, St. Louis, Mo.

[21] Appl. No.: 396,420

[22] Filed: Aug. 21, 1989

[51] Int. Cl.$^5$ .............................................. C02F 11/14
[52] U.S. Cl. .................................... 210/751; 210/759; 210/911; 210/912; 423/DIG. 20; 106/716; 106/736; 106/815
[58] Field of Search ............... 210/751, 758, 759, 911, 210/912; 423/DIG. 20; 106/97

[56] References Cited

U.S. PATENT DOCUMENTS

| | | | |
|---|---|---|---|
| 3,980,558 | 9/1976 | Thompson | 210/751 |
| 4,118,243 | 10/1978 | Sandesara | 210/751 |
| 4,142,912 | 3/1979 | Young | 210/751 |
| 4,201,667 | 5/1980 | Liao | 210/911 |
| 4,404,105 | 9/1983 | Rysman de Lockerente et al. | 210/710 |
| 4,419,246 | 12/1983 | Jayawant | 210/912 |

FOREIGN PATENT DOCUMENTS 1111157  10/1981  Canada ................................ 210/911

Primary Examiner—Peter Hruskoci
Assistant Examiner—Krisanne Shideler
Attorney, Agent, or Firm—Richard H. Shear; Arnold H. Cole; Raymond C. Loyer

[57] ABSTRACT

A method of disposing of wastes containing heavy metal compounds by neutralizing the wastes, oxidizing the neutralized wastes, then solidifying the oxidized wastes using conventional mineral binding agents such as Portland cement. This method is of particular interest in treating arsenic sulfide containing aqueous sludges produced in the manufacture of phosphoric acid.

9 Claims, No Drawings

METHOD OF DISPOSING OF WASTES CONTAINING HEAVY METAL COMPOUNDS

BACKGROUND OF THE INVENTION

This invention relates to a method of disposing of wastes containing heavy metal compounds by neutralizing the wastes, oxidizing the neutralized wastes, then solidifying the oxidized wastes using conventional mineral binding agents.

The disposal of liquid wastes by binding with conventional mineral binding agents, such as Portland cement, that set up to form insoluble solid wastes is well known in the art. U.S. Pat. No. 3,980,558 discloses the disposal of aqueous sludge from the manufacture of phosphoric acid containing soluble and insoluble arsenic with hydraulic cement to form a rock-like solid mass. The arsenic is entrapped in the solid and thereby prevented from being leached in the surrounding environment. No adjusting of pH is disclosed.

Japanese Kokai Patent No. Sho 47[1972]-31869 discloses the disposal of heavy metal containing wastes by adjusting the pH in the range of from 6.0 to 7.5 to precipitate heavy metals from plating waste water, then mixing with cement to form a solid mass.

U.S. Pat. No. 4,113,504 discloses the fixing of heavy metal containing sludge waste using vermiculite and cement. Two samples of arsenic containing sludge are adjusted to pH 11 using lime before being fixed.

U.S. Pat. No. 4,116,705 discloses the treating of hazardous waste with an aluminosilicate and a Portland cement to form a solid mass. For acidic samples, the desired mixing order of the hazardous waste is with the Portland cement first, then the aluminosilicate. No adjusting of pH is disclosed.

U.S. Pat. No. 4,118,243 discloses a method of disposing of arsenic containing wastes by reacting the aqueous waste with sulfuric acid and calcium hydroxide in the presence of sulfate ions and ferrous and/or ferric ions to form insoluble iron orthoarsenate and iron diarsenide. This procedure recommends that the mixture be a pH in the range of 4.0 to 10.5, since a lower pH causes an increase in the amount of arsenic in the leachate.

U.S. Pat. No. 4,142,912 discloses a method for treating arsenic containing wastes by mixing the wastes with Portland cement, sand, one or more water-soluble manganese or alkaline earth metal salts, and water to form a rock-like material. This patent teaches that the use of calcium hydroxide is inferior to the use of calcium chloride for decreasing leachability.

U.S. Pat. No. 4,149,968 discloses a method of treating aqueous hazardous industrial wastes by mixing the wastes with bentonite clays and Portland cement. One sample of steel pickling solution is pH adjusted to 12.0 using lime before treating, and a clarifier effluent from a sulfur dioxide scrubbing process is treated at an unadjusted pH of 5.5.

U.S. Pat. No. 4,329,179 discloses a method of treating arsenic containing wastes by mixing with a tricalcium aluminate-free hydraulic cement. No adjusting of pH is disclosed.

None of the above patents disclose the present method of disposing of wastes containing heavy metal compounds by neutralizing the wastes, oxidizing the neutralized wastes, then soldifying the oxidized wastes using conventional mineral binding agents. The present method provides a way of disposing of wastes containing heavy metals which effectively reduces the leaching of toxic materials in the surrounding environment, and thereby eliminates the polluting of underground water systems and surface waters.

SUMMARY OF THE INVENTION

The present invention is a method of disposing of wastes containing heavy metal compounds by neutralizing the wastes, oxidizing the neutralized wastes, then solidifying the oxidized wastes using conventional mineral binding agents.

DETAILED DESCRIPTION OF THE INVENTION

The method of the present invention is useful for disposing of wastes containing heavy metal compounds. More particularly, this method is useful for disposing of aqueous sludge wastes from chemical processes for the manufacture of phosphoric acids. Of particular interest are arsenic sulfide containing aqueous filter aid sludges produced in the manufacture of phosphoric acids. These sludges normally contain undesirably high levels of arsenic, e.g., up to about 2% arsenic as arsenic compounds, such as arsenic pentasulfide, arsenic trisulfide, arsenic acid, calcium arsenate and calcium arsenide, along with other contaminants such as metal sulfides and other sulfur compounds. The aqueous sludges further normally contain about 30 to 40 volume % solids content which includes a wide variety of mineral compounds, such as diatomaceous earth filter aid, insoluble arsenic, sulfur, iron, phosphoric and other compounds.

The aqueous sludge stream is typically acidic, having a pH below 4. The method of neutralizing the acidic sludge is not critical, and any of many well known methods of neutralization may be used, e.g., the use of sodium hydroxide, potassium hydroxide, calcium hydroxide, lime or mixtures thereof. Calcium hydroxide is the preferred neutralizing agent, since it is a component of the cement to be used for solidifying and will not adversely affect the solid produced. As the aqueous sludge is neutralized, the arsenic sulfide dissolves, and its color typically turns from yellow to gray. The aqueous sludge is preferably neuturalized to a pH in the range from about 7 to about 10, the most preferred range is from about 8 to 9.

The neutralized aqueous waste is then oxidized. The method of oxidation is not critical, and can be any of many well known methods used employing oxidants such as hypochlorous acid, nitric acid or hydrogen peroxide. Hydrogen peroxide is the preferred method, since it leaves no residual acid to be neutralized. If an acid is used as the oxidizing agent, it must be neutralized before the solidification step that follows, or it may adversely affect the properties of the solid produced. If hydrogen peroxide is used for oxidation, a molar excess of hydrogen peroxide is used to effect the oxidation, in the range of 10% to 2000% molar excess. The preferred range is from about 10% to about 500% molar excess.

It has been found that the use of either the neutralization step or the oxidation step, taken alone, is ineffective to reduce the leaching of heavy metals into the environment. In accordance with the method of this invention, the combination of both neutralization and oxidation is required to reduce leaching of the heavy metals from the solids produced with the mineral binding agents.

The final step of this method, after neutralization and oxidation, is solidification, using a conventional mineral binding agent, such as hydraulic cement. This includes all mixtures of lime with silica and alumina, lime and magnesia, or silica with alumina and iron oxide. These mixtures, when mixed with water, set to form a rock-like solid. Hydraulic cements include hydraulic limes, grappier cement, puzzolan cements and Portland cements. Type V Portland cement, i.e., sulfate resisting Portland cement, is preferred, since it more effectively reduces the leachability of arsenic from the solid mass. The treated waste may be mixed with the cement alone or may be mixed with various additives, such as clay, bentonite, kaolin, limestone, pebbles or other inert aggregates. Preferably, the hydraulic cement is mixed with the waste alone.

The cement is mixed with the treated wastes in amounts that, upon setting, will provide such a compressive strength and porosity in the rock-like solid that the heavy metal compounds entrapped will essentially not leach out when exposed to ambient moisture. The amount of cement to sludge, expressed in weight ratio of dry solids is usually in the range of about 10 to 1 to 1 to 10, preferably in the range of about 5 to 1 to 1 to 2. It is preferred to use lower cement to dry solids ratios (<5.0), because the present method of treatment is made more economical by using less cement. It is at these lower ratios that the effect of the neutralization and oxidation steps in reducing the concentration of heavy metals in the leachate is more pronounced. At higher ratios (>5), the effect of neutralizing and oxidizing is reduced, probably due to the dilution effect of having more cement in the mixture.

The weight of dry cement to weight of water sufficient to mix the solids is usually in the range of about 10 to 1 to 2 to 1, preferably in the range of about 6 to 1 to 2 to 1. If insufficient cement is used in the mixture, the compressive strength of the resulting solid is reduced. If too much cement is used, the water, sludge and cement cannot be properly mixed and the compressive strength of the resulting solid is likewise reduced.

The mixing of the treated sludge with the cement can be effected using any conventional technique to provide an intimate mixture. The mixture is allowed to set to form a contiguous rock-like solid mass having a high compressive strength which is insoluble in water and is substantially impervious to water. More importantly, the leachability of the heavy metals will be extremely low, typically in the range of about 0.1 to about 1.0 ppm. Normally, the mixture will set in about 12 h. to 24 h.

The following examples are intended to illustrated the present invention and are not to limit the claims in any manner.

EXAMPLES

Samples of aqueous sludge from the manufacture of phosphoric acid which contained arsenic compounds were obtained for treatment. The amount of dry solids in the sludge samples was determined by allowing the solids in the sludge to settle, decanting off the supernatent liquid to provide a cake of wet solids which was dried at 100° C. for about 16 h. and weighed. The percent dry solids is reported in Table 1 below as percent by weight. Analysis of the untreated samples for acid, arsenic and sulfur is also reported in Table 1 below as percent by weight. For purposes of this invention all acids were assumed to be phosphoric acid and the amount is determined by titration with sodium hydroxide.

TABLE 1

| | Analysis of Untreated Sludge Samples | | | | |
|---|---|---|---|---|---|
| Sample | Water | Solids | Acid | Arsenic | Sulfur |
| 1 | 46.1 | 53.9 | 1.2 | 1.7 | 2.1 |
| 2 | 33.3 | 66.7 | 31.7 | 1.2 | 1.4 |

In the following examples and controls, the ratio of cement to dry solids was varied from 0.5 to 10.0. The amount of water was adjusted to be, by weight, 40% of the cement used. The sludge samples were neutralized by adding calcium hydroxide until the filter cake turned from yellow to gray, usually at a pH of about 9. The neutralized sludge samples were then oxidized using hydrogen peroxide at a stoichiometric excess of about 10% by weight.

The aqueous sludge samples were treated in a Hobart TM heavy-duty mixer using from 500 to 2000 g of sludge, and the indicated amounts of water, calcium hydroxide, hydrogen peroxide and cement, added in the above order. After all the ingredients were added to the mixer, they were mixed for about 5 min. If a fluid paste was not formed, additional water was added and then mixed for about 5 min. The fluid paste was poured into 4 oz (0.12 l) specimen cups and allowed to solidify for the indicated number of days. The solid samples were analysed as indicated below.

The leachability of the solid was determined by the Toxicity Characteristic Leaching Procedure disclosed in the Federal Register, Vol. 51, No. 114, June 13, 1986, page 21685, which is hereby incorporated by reference. Using this procedure, the solid sample was broken into pieces small enough to pass through a $\frac{3}{8}$ inch (9.5 mm) screen. The solids were then mixed with an acetic acid solution and leached for 18 h. The samples and solution were agitated by tumbling the extraction vessel at a rate of 30 rpm. The amount of arsenic in the leachate was determined by liquid chromatography. The solid was allowed to cure in the range of from 29 to 678 days, and then tested for leachability. The results of the analysis are shown in Tables 2, 3, 4 and 5. Unless otherwise noted, all results are percent by weight.

In Table 2 is shown a comparison of unneutralized and unoxidized samples (C-1 through C-7) to those of the present invention, i.e., neutralized and oxidized samples (examples 1 through 7). The aqueous sludge sample used was Sample 1, the cement to solids weight ratio was 5, and the pH was adjusted to about 9. A significant decrease in arsenic in the leachate is observed for the examples of the present invention.

TABLE 2

| The Present Invention versus Unneutralized and Unoxidized | | | |
|---|---|---|---|
| Sample | Type of Portland Cement | Days Cured | Arsenic in Leachate (ppm) |
| 1 | I | 55 | 0.20 |
| 2 | I | 265 | 0.38 |
| C-1 | I | 51 | 2.60 |
| C-2 | I | 281 | 4.4 |
| 3 | V | 73 | 0.10 |
| 4 | V | 171 | 0.10 |
| 5 | V | 294 | 0.13 |
| 6 | V | 368 | 0.14 |
| 7 | V | 602 | 0.30 |
| C-3 | V | 87 | 0.52 |
| C-4 | V | 198 | 0.87 |
| C-5 | V | 296 | 2.86 |
| C-6 | V | 333 | 1.66 |

TABLE 2-continued

The Present Invention versus Unneutralized and Unoxidized

| Sample | Type of Portland Cement | Days Cured | Arsenic in Leachate (ppm) |
|---|---|---|---|
| C-7 | V | 663 | 3.6 |

In Table 3 is shown a comparison of unneutralized and unoxidized samples (C-8 through C-12) to samples that were neutralized but not oxidized (C-13 through C-17). The aqueous sludge sample used was Sample 1, the cement used was Portland I, the cement to solids weight ratio was 5, and the pH was adjusted to about 9. The unadjusted sample had a pH of about 2. Little or no improvement was observed for the samples that were neutralized versus the samples that were unneutralized.

TABLE 3

Unneutralized and Unoxidized versus Neutralized Samples

| Sample | | Days Cured | Arsenic in Leachate (ppm) |
|---|---|---|---|
| C-8 | | 35 | 1.70 |
| C-9 | | 75 | 1.69 |
| C-10 | | 96 | 1.83 |
| C-11 | | 301 | 4.12 |
| C-12 | | 678 | 6.90 |
| C-13 | (neutralized) | 34 | 1.36 |
| C-14 | " | 76 | 1.79 |
| C-15 | " | 103 | 1.68 |
| C-16 | " | 300 | 4.64 |
| C-17 | " | 677 | 6.40 |

In Table 4 is a comparison of unneutralized and unoxidized samples (C-18 through C-22) versus oxidized but unneutralized samples (C-23 through C-27). The aqueous sludge sample used was Sample 2, the cement used was Portland I, the cement to solids ratio was varied in the range of from 0.5 to 5.0, and the unadjusted pH was about 2. At lower cement to solids ratios, e.g., 0.5 and 1.0, the oxidized samples had higher arsenic concentrations in the leachate than the unoxidized samples (see C-18, C-19 and C-20 versus C-23, C-24 and C-25). At higher cement to solids ratios, e.g., 3.0 and 5.0, the differences in leachate concentration were smaller, possibly due to an effect from the greater amounts of cement in the treated samples in the formation of a matrix (see C-21 and C-22 versus C-26 and C-27).

TABLE 4

Unneutralized and Unoxidized versus Oxidized Samples

| Sample | | Cement to Solids Ratio | Days Cured | Arsenic in Leachate (ppm) |
|---|---|---|---|---|
| C-18 | | 0.5 | 50 | 90.0 |
| C-19 | | 0.5 | 592 | 180.0 |
| C-20 | | 1.0 | 135 | 120.0 |
| C-21 | | 3.0 | 595 | 9.10 |
| C-22 | | 5.0 | 138 | 0.77 |
| C-23 | (Oxidized) | 0.5 | 70 | 235.0 |
| C-24 | " | 0.5 | 654 | 200.0 |
| C-25 | " | 1.0 | 102 | 18.87 |
| C-26 | " | 3.0 | 654 | 2.7 |
| C-27 | " | 5.0 | 51 | 0.22 |

In Table 5 is a comparison of neutralized and unoxidized samples (C-28 through C-30) and samples of the present invention, i.e., neutralized and oxidized samples (examples 8 through 12). The aqueous sludge used was Sample 1, the type of cement used was Portland V, the cement to solids weight ratio was 10.0, and the pH was adjusted to about 9. The differences in arsenic concentration in the leachate is less pronounced in these samples, probably due to the high cement to solids ratio (10.0), as noted above. Some lowering of the arsenic concentration in the leachate was observed for a longer cure time (about 660 days) for the present invention versus the unoxidized sample (see example 12 and C-30).

TABLE 5

Neutralized versus the Present Invention

| Sample | Days Cured | Arsenic in Leachate (ppm) |
|---|---|---|
| 8 | 42 | <0.1 |
| 9 | 85 | <0.1 |
| 10 | 378 | <0.1 |
| 11 | 451 | <0.1 |
| 12 | 652 | <0.1 |
| C-28 | 31 | 0.13 |
| C-29 | 87 | <0.1 |
| C-30 | 663 | 0.4 |

We claim:

1. A method of disposing of aqueous sludge wastes containing heavy metal compounds and arsenic sulfide comprising (1) neutralizing the wastes to a pH of from about 7 to about 10 and dissolving the arsenic sulfide, (2) oxidizing the neutralized wastes, and (3) solidifying the oxidized wastes using mineral binding agents, wherein the combination of neutralizing and oxidizing is sufficient to reduce leaching of the arsenic from the solids produced with the mineral binding agents.

2. The method of claim 1 wherein the wastes are aqueous sludge wastes from chemical processes for the manufacture of phosphoric acids.

3. The method of claim 2 wherein the wastes are neutralized with calcium hydroxide.

4. The method of claim 3 wherein the wastes are oxidized with hydrogen peroxide.

5. The method of claim 4 wherein the wastes are bound using hydraulic cement.

6. The method of claim 5 wherein the hydraulic cement is selected from the group consisting of Portland I cement and Portland V cement.

7. A method of disposing of aqueous sludge wastes containing arsenic sulfide from chemical processes for the manufacture of phosphoric acids comprising (1) neutralizing the wastes to a pH of from about 7 to about 10 and dissolving the arsenic sulfide with calcium hydroxide, (2) oxidizing the neutralized wastes with hydrogen peroxide, and (3) solidifying the oxidized wastes using hydraulic cement, wherein the combination of neutralizing and oxidizing is sufficient to reduce leaching of the arsenic from the solids produced with the hydraulic cement.

8. The method of claim 7 wherein the aqueous sludge is neutralized in the range of pH from about 7 to about 10, the neutralized wastes are oxidized using a 10% to 2000% molar excess of hydrogen peroxide, and the oxidized wastes are solidified using a weight ratio of dry solids of cement to sludge in the range of about 10 to 1 to 1 to 10.

9. The method of claim 7 wherein the aqueous sludge is neutralized in the range of pH from about 8 to about 9, the neutralized wastes are oxidized using a 10% to 500% molar excess of hydrogen peroxide, and the oxidized wastes are solidified using weight ratio of dry solids of cement to sludge in the range of about 5 to 1 to 1 to 2.

* * * * *